T. D. KNIGHT.
PLANING MACHINE.
No. 16,777. Patented Mar. 3, 1857.
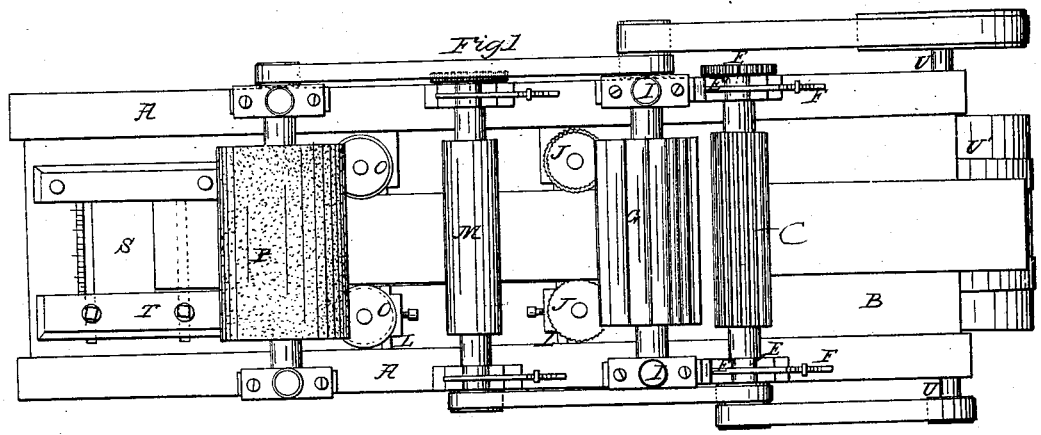
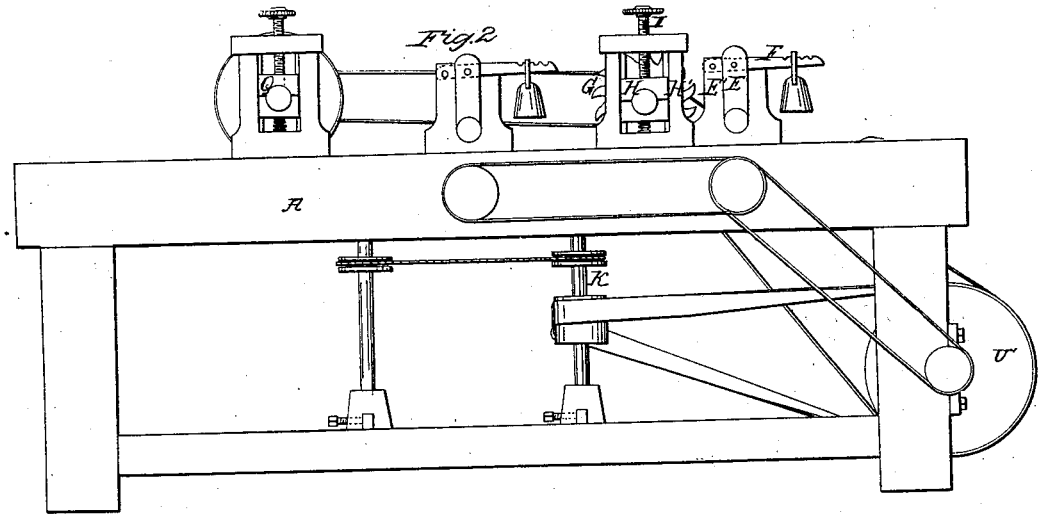
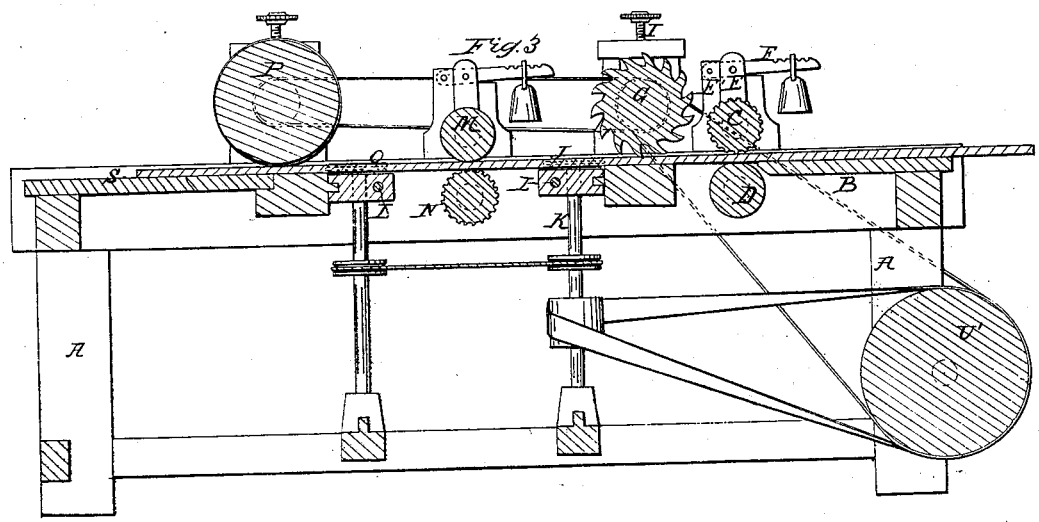

UNITED STATES PATENT OFFICE.

TRISTRAM D. KNIGHT, OF CHARLESTON, TENNESSEE.

MACHINE FOR REDUCING AND SMOOTHING BOARDS TO UNIFORM THICKNESSES.

Specification of Letters Patent No. 16,777, dated March 3, 1857.

*To all whom it may concern:*

Be it known that I, TRISTRAM D. KNIGHT, of Charleston, in the county of Bradley and State of Tennessee, have invented a new and useful Improvement in Planing-Machines, of which the following is a full, clear, and exact description, reference being had to the accompanying drawing, which makes part of this specification, and in which—

Figure 1 represents a plan of a planing machine embracing my improvement. Fig. 2 represents an elevation of one side of the same, and Fig. 3 represents a longitudinal vertical section of the same.

My invention consists in combining with a rotary saw, for reducing and equalizing the thickness of lumber, a rotary grinder to remove the inequalities and roughness left by the reducing saw, and thereby produce an even, smooth and polished surface on the lumber, which will admit of its being used, without redressing, in situations in which evenness and smoothness of surface are essential.

The planing machines in most general use are of the kind termed "rotary planers." In these machines a board is reduced to a uniform thickness and planed on one side, by means of a rotary lathe, which dubs off, from that side of the board upon which it acts, the excess of material above the thickness required, and, as the chips dubbed off by an adze are convex on the under side, they leave corresponding concavities in the board, which is thus finished with a wavy surface. As these waves are rendered more apparent when the boards are painted or varnished the lumber planed by these machines is not suitable for finished work unless replaned by hand.

It is the main object of my invention to secure all the advantages resulting from the efficiency of the rotary cutter, its simplicity of construction, its cheapness and its durability, and, at the same time, to finish the lumber with a plane surface.

Upon reference to the accompanying drawing, the nature of my invention will more fully appear. A strong oblong frame (A), supported on posts, has, at one end, a bed (B), to sustain and guide the lumber as it enters between a pair of feed rollers (C D), the upper one (C) of which has its surface ribbed, to prevent it from slipping on the lumber. The upper bearing (E) of this roller (C), slides in guides (E') attached to the top of the frame, to permit it to move from and toward the lower roller (D) to adapt it to the varying thickness of lumber, and pressure is communicated to it to cause it to grasp the lumber with proper force, by means of weighted levers (F) which are hinged to the guides and rest upon the upper bearing (E). In front of this pair of feed rollers, is a rotary saw (G) for reducing the lumber to a thickness: this saw is about the same width as the bed of the machine, and its teeth may be slightly hooked, in the direction of its rotation.

The boxes H in which the journals of the saw run, are adjustable, in guides (H'), in which they slide, by means of adjusting screws (I), in order to vary the distance between the saw and the bed of the machine, to adapt it for planing lumber of different thicknesses. A set of tonguing and grooving or edge saws (J), to tongue and groove or equalize the width and to dress the edge of the lumber, are attached to the tops of vertical shafts (K) and they are adapted to dressing lumber of different widths by making the boxes in which their shafts turn, adjustable on the bars (L). The boxes are retained in place, when adjusted, by means of set screws. Forward of the edge-saws is another pair of feed-rollers (M N) constructed and arranged in the same manner as those previously described, with the exception that the upper roller (M) is smooth instead of ribbed, so that it may not indent the surface of the board, after it has been reduced by the saw (G). Next in succession on the frame is a set of rotary edge-grinders (O), for smoothing the edges of the lumber; the peripheries of these grinders are covered with emery, and they correspond, in outline, with the edge-saws previously described, their arrangement and mode of adjustment being also the same. A horizontal grinding cylinder (P), is placed forward of these edge-grinders. The surface of this cylinder is also coated with emery, for the purpose of polishing, and removing from the surface of, the lumber, the roughness and inequalities left by the reducing saw (G). The journals of this cylinder run in boxes (Q), which are adjustable for different thicknesses of lumber, in the same manner as those of the reducing saw. A supporting bed (S) placed forward of the grinding cylinder, has a sliding gage (T) attached to it, which is used as an edge-guide for the lumber in passing through the machine, to keep it in contact with the edge saws and edge grinders.

A shaft (U), running in boxes on the side posts beneath the table (B), carries a drum (U'), by which motion is given to different parts of the machine, through the medium of bands.

Motion being communicated to the machine, one end of the board to be dressed, is entered between the first set (C D) of feed rollers, which seize and draw it through between, pushing it forward under the reducing saw (G), which cuts it down to an equal thickness; thence it passes between the tonguing and grooving or edge saws (J) which equalize its width, straighten its edges and work a tongue and groove thereon. The board, in its progress through the machine, next passes between the second set (M N) of feed rollers, which assist in drawing it under the saw and pushing it forward to the grinders; it next passes between the edge-grinders (O) which remove the roughness, left by the edge-saws, on the tongue and groove; thence it passes under the grinding cylinder (P) by which the roughness and inequalities left upon its surface by the reducing saw, are ground down and the surface polished, thus giving to the lumber, before it leaves the machine, a finish which adapts it for such work as requires smoothness and evenness of surface.

The distances between the teeth of the reducing saw are so short, and its velocity so great as compared with the feed of the board, that the ridges and furrows upon the reduced lumber are so slight, that a very small amount of material is required to be removed by the grinder, to form a smooth and polished surface on the lumber.

I do not restrict myself to the cylindrical form of the grinder, as the disk or some other form might, under certain circumstances, be substituted with advantage. Neither do I confine myself to the use of an emery grinding surface, as many other things are well known, for abrading and polishing wood, which might be employed in the place of emery, and, as an example, I will mention rasps and files, but the variety of such things is too well known to require special enumeration and too numerous to be particularized in a specification.

What I claim as my invention and desire to secure by Letters Patent, is—

The combination of the reducing saw with the finishing grinder, for the purpose described.

In testimony whereof, I have hereunto subscribed my name.

TRISTRAM D. KNIGHT.

In presence of—
S. D. STOUT,
A. P. McCLATCHY.